United States Patent
Sugiyama et al.

(10) Patent No.: US 6,503,647 B1
(45) Date of Patent: Jan. 7, 2003

(54) BATTERY PROTECTION DEVICE AND METHOD OF MAKING SAME

(75) Inventors: Akitsugu Sugiyama, Gotenba (JP); Kouzoh Nagano, Gotenba (JP); Eiji Teshima, Togane (JP); Hirotoshi Tsuchiya, Shizuoka (JP)

(73) Assignee: Texas Instruments Incorporated, Dallas, TX (US)

( * ) Notice: Subject to any disclaimer, the term of this patent is extended or adjusted under 35 U.S.C. 154(b) by 5 days.

(21) Appl. No.: 09/635,934

(22) Filed: Aug. 10, 2000

(30) Foreign Application Priority Data

Aug. 18, 1999 (JP) .......................................... 11-231314

(51) Int. Cl.[7] .............................................. H01M 2/20
(52) U.S. Cl. ................... 429/7; 429/61; 429/62
(58) Field of Search ........................... 429/96–100, 7, 429/61, 62; 337/333, 362, 365

(56) References Cited

U.S. PATENT DOCUMENTS

| | | | | |
|---|---|---|---|---|
| 4,112,201 A | * | 9/1978 | Mabuchi et al. | 429/62 |
| 4,603,165 A | * | 7/1986 | McDonald et al. | 429/101 |
| 4,894,634 A | | 1/1990 | Nezuka et al. | |
| 5,248,927 A | * | 9/1993 | Takei et al. | 320/113 |
| 5,252,411 A | * | 10/1993 | Yokokawa et al. | 320/154 |
| 5,367,279 A | | 11/1994 | Sakai | |
| 5,428,336 A | * | 6/1995 | Smith et al. | 337/365 |
| 5,607,610 A | | 3/1997 | Furukawa | |
| 5,844,464 A | * | 12/1998 | Kalapodis et al. | 337/14 |

* cited by examiner

Primary Examiner—Carol Chaney
(74) Attorney, Agent, or Firm—Russell E. Baumann; Frederick J. Telecky, Jr.

(57) ABSTRACT

A battery protection device (10) has a hollow casing body (11) formed by ultrasonic welding of a first casing member (12) and a second casing member (13) with respect to casing body (11), a first external terminal extends from a first end surface (11b) and a second external terminal extends from a second end surface (11c). The battery protection device (10) further has a first contact (18) connected to the first external terminal, a second contact (16) connected to the second external terminal, and a bimetallic member (17) which enables the connection between and first and second contacts to be opened and closed. In a second embodiment one of the casing member (72) is formed of a sheet of electrically insulative material which is received over and closes the opening in the other casing member (71).

10 Claims, 6 Drawing Sheets

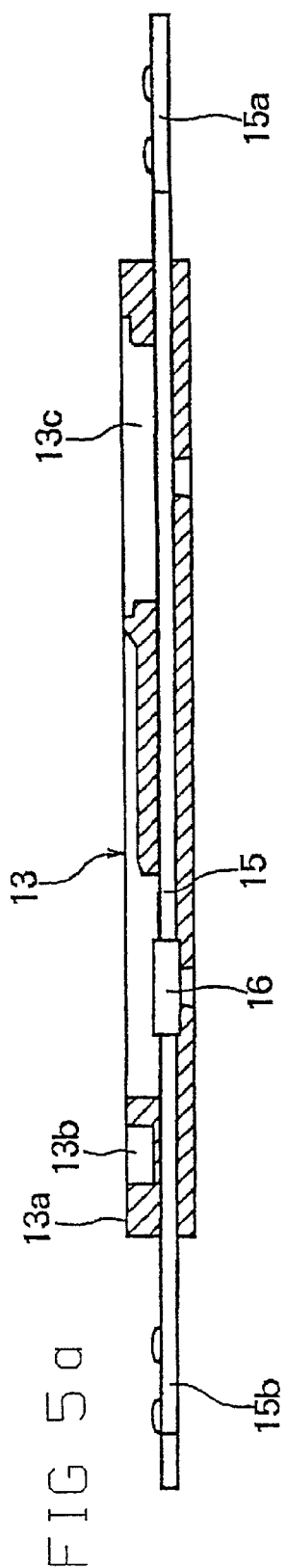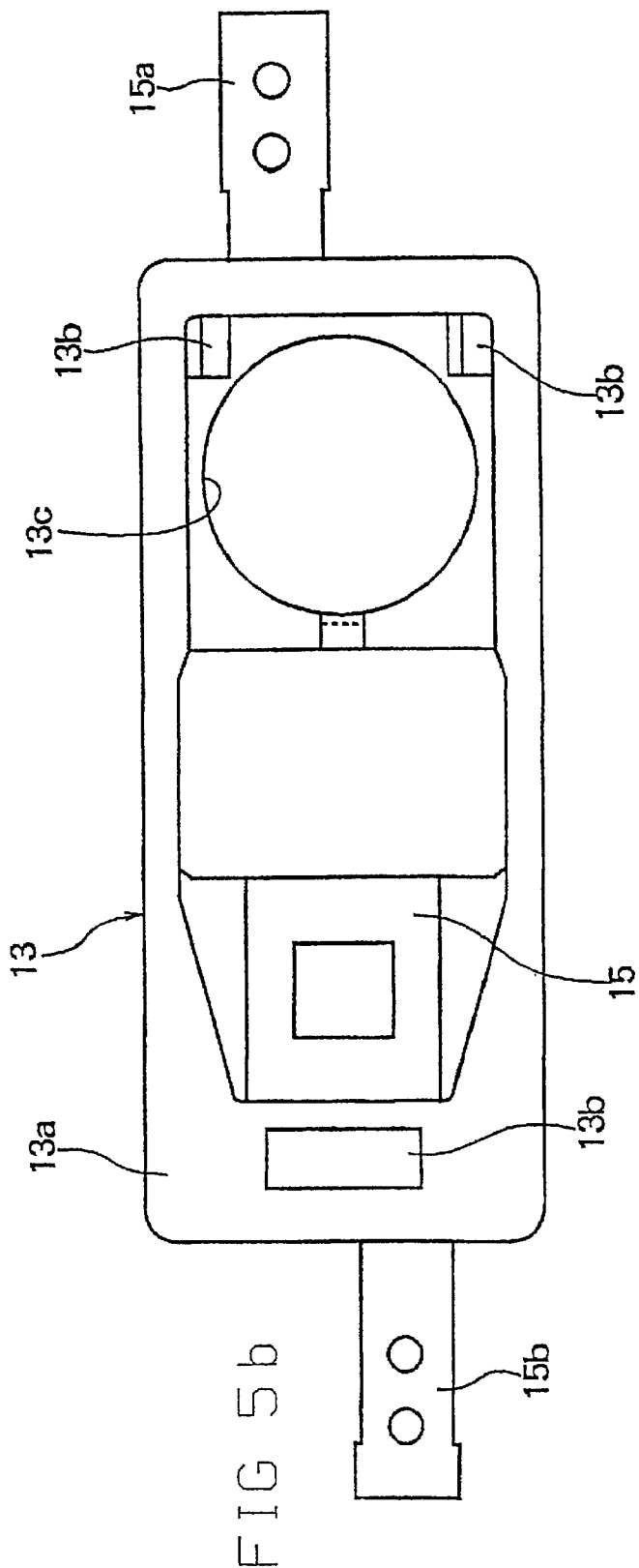

BATTERY PROTECTION DEVICE AND METHOD OF MAKING SAME

FIELD OF THE INVENTION

This invention relates to a battery protection device for the protection of batteries and associated electric equipment from excess current or heat from the battery and to a method for making the device.

BACKGROUND OF THE INVENTION

A battery protection device or battery protector (hereafter called battery protector) is electrically connected between a battery and its related electronic equipment such as a portable computer, a camera, communications instrument, automobile control equipment, and the like so that it can open the electrical circuit to the electronic equipment in the event that excess current or excess heat is received from the battery, thereby protecting the electronic equipment. Ordinarily, the battery protector is loaded in a casing accommodating secondary cells as the battery (hereafter called battery pack).

Along with the trend in recent years for reducing the size of electronic equipment, there has been a corresponding demand for efficiently locating the battery protector in a limited space within the battery pack. One of the effective ways of arranging the battery protector is one in which it is placed within one of the elongated openings formed between contiguous cylindrically-shaped secondary batteries. An elongated generally triangular gap is produced between contiguous batteries and the external wall of the battery pack and the battery protector having a cylindrical shape can be accommodated therein. A conventional battery protector comprises a pair of external terminals inserted into a tubular casing body with one end open and with the opening sealed tightly by an adhesive material with the pair of external terminals extending out of the sealed end thereof. Mounting a conventional battery protector in a gap inside the battery pack, typically includes the following problems: (a) Where one of the external terminals of the battery protector is to be connected to one end of a second cell, and the other external terminal is to be connected to the other end of another secondary cell, one of the external terminals of the protector must be bent toward the opposite end since both of the external terminals extend outwardly from the same end of the casing body. As a result, extra steps are required in connection with the accommodation of the battery protector and, at the same time, the efficient use of the space is compromised because of the bending. In addition, there tends to develop a dimensional error with regard to the connection to the secondary cells and the increased likelihood of the insulation film of the terminal being damaged by the edge of the bent part (b). In the battery protection made according to the prior art, moreover, due to the use of adhesive material for the sealing of the functional parts, there is a delay in the assembly process of placing the protector into the battery pack in order to allow for the completion of the hardening or curing of the adhesive agent (which is normally up to eight hours), thereby consuming a considerable time before the protector can be mounted.

SUMMARY OF THE INVENTION

Accordingly, an object of the present invention is the provision of a battery protector having an improved construction which overcomes the limitations and problems of the above noted prior art and effectively accommodates the protector in a battery pack and a method for making the battery protector. Another object of the invention is to provide improved efficiency for the preparation of a battery protector and thus improving productivity.

Briefly stated, a battery protection device made according to the invention comprises a hollow casing body which is formed by attaching a first casing member to a second casing member, a first end surface and a second end surface on the opposite side, a first external terminal that is caused to extend from the end of the first end surface, a second external terminal that extends from the second end surface, a first electrical contact arranged inside of the casing body and electrically connected to the first external terminal, a second electrical contact arranged inside of the casing body and electrically connected to the second external terminal and a thermostatic member such as a bimetal element connected to the first external terminal and, at the same time, mounting the first contact as a movable contact, thereby enabling opening and closing movement between the first contact and the second contact.

In view of the fact that the battery protection device made in accordance with the invention has external terminals disposed at opposite end surfaces, there is no need to use the device by bending one of the external terminals when used in the manner described above. In additional, the battery protection device made according to the invention does not use an adhesive agent in its assembly and this contributes toward an improvement in productivity.

According to a feature of the invention, at least one of the first and second terminals is insert-molded in at least one of the casing members. In one preferred embodiment, the first and second external terminals are made integral with and insert molded in the second casing member. According to another feature of the invention, a positive temperature coefficient of resistivity thermistor is connected in parallel with the bimetal element between the first and second external terminals. According a feature of a modified embodiment, one of the first and second casing members comprises an insulating film. The invention further comprises a battery pack in which the battery protection device is arranged in one of the gaps created between contiguous ones of a plurality of parallelly disposed cylindrical batteries. In this arrangement, it is preferred that the battery protection device be serially connected in the electric current path that connects the plurality of batteries with the first and second external terminals being so arranged that the first external terminal and the second external terminals extend in different directions inside of a gap between contiguous batteries. The invention further comprises, in combination, electronic equipment that is equipped with the battery pack. The invention further comprises a method for making the battery protection device having a first casing member and a second casing member that form a hollow casing body with a first end surface and an opposed second end surface on the opposite side, comprising a step for insert molding of the second casing member with the first external terminal extending from the first end surface and, at the same time, the second external terminal extending from the opposite second end surface, a step for incorporating the first and second contacts and the bimetal element that relatively opens or closes the first and second contacts in the second casing member, and a step for ultrasonic wave welding of the first and second casing members on their engagement surfaces, thereby forming the hollow casing member. The method may further include a step for arranging the battery protection device in one of the gaps between contiguous batteries of a plurality of batteries that have been parallelly arranged in a battery pack.

Additional objects and features of the invention will be set forth in the description which follows and in part will be obvious from the description. The objects and advantages of the invention may be realized and attained by means of the instrumentalities, combinations and methods particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the objects, advantages and principals of the invention. In the drawings:

FIGS. 5a and 5b are side cross sectional and top plan views respectively of the lower casing member of the FIG. 1 protector prior to assembly;

DETAILED DESCRIPTION OF THE PREFERRED EMBODIMENT

Figure 1:
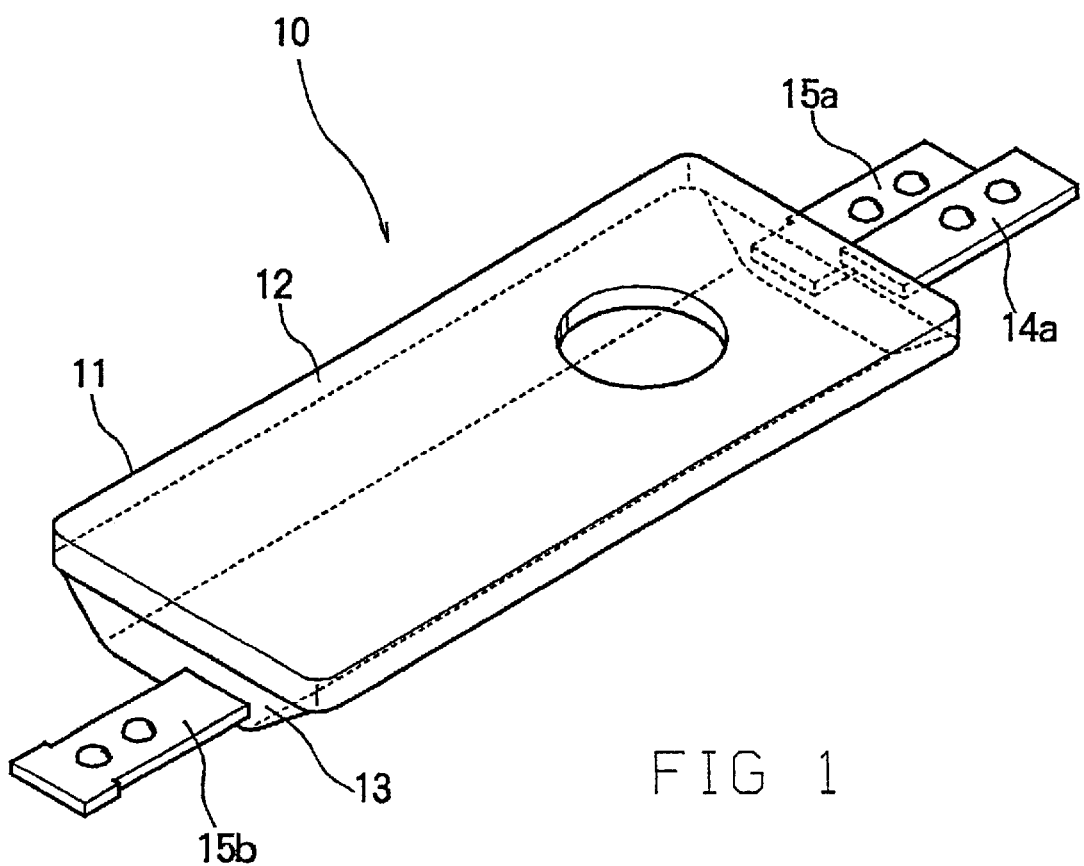
FIG. 1 is a perspective view of a battery protector made according to a first embodiment of the invention.

The embodiments of the invention explained below are particularly adapted for use as a battery protector to be used with portable electronic equipment of the battery powered type such as portable computers, cameras, portable telephones and other communications equipment. The battery protector made in accordance with the invention protects the electronic equipment and the battery itself from excess current or excess heat from the battery that powers the electronic equipment.

FIGS. 1, 2a, 2b, 2c and 3 show an assembled battery protector according to a first embodiment of the invention. In these figures, battery protector 10 has a thin cubic casing body 11. The casing body 11 has an empty cavity 11a inside for the accommodation of the functional parts of the battery protector. The functional parts of the battery protector need to be electrically isolated from the external environment and, as will be described later, they should be capable of reacting to thermal changes in a battery disposed nearby. Casing body 11 is composed of materials which are capable of conducting heat from the ambient as much as possible, while providing electrical isolation. They are, for example, insulating materials having high heat conductivity such as liquid crystal polymer resin. Casing body 11 comprises two casing members, upper casing member 12 and lower casing member 13. As shown in end view, FIG. 2c, lower casing member 13 is formed with both front and back sides 13d, 13e obliquely slanted inwardly toward a central portion of bottom surface 13f so that body 11 can be effectively accommodated in a generally triangular gap between contiguous parallely disposed cylindrical batteries. Each casing member 12 and 13 has a mating engagement surface 12a and 13a along the respective peripheral sides facing one another.

Figure 2:
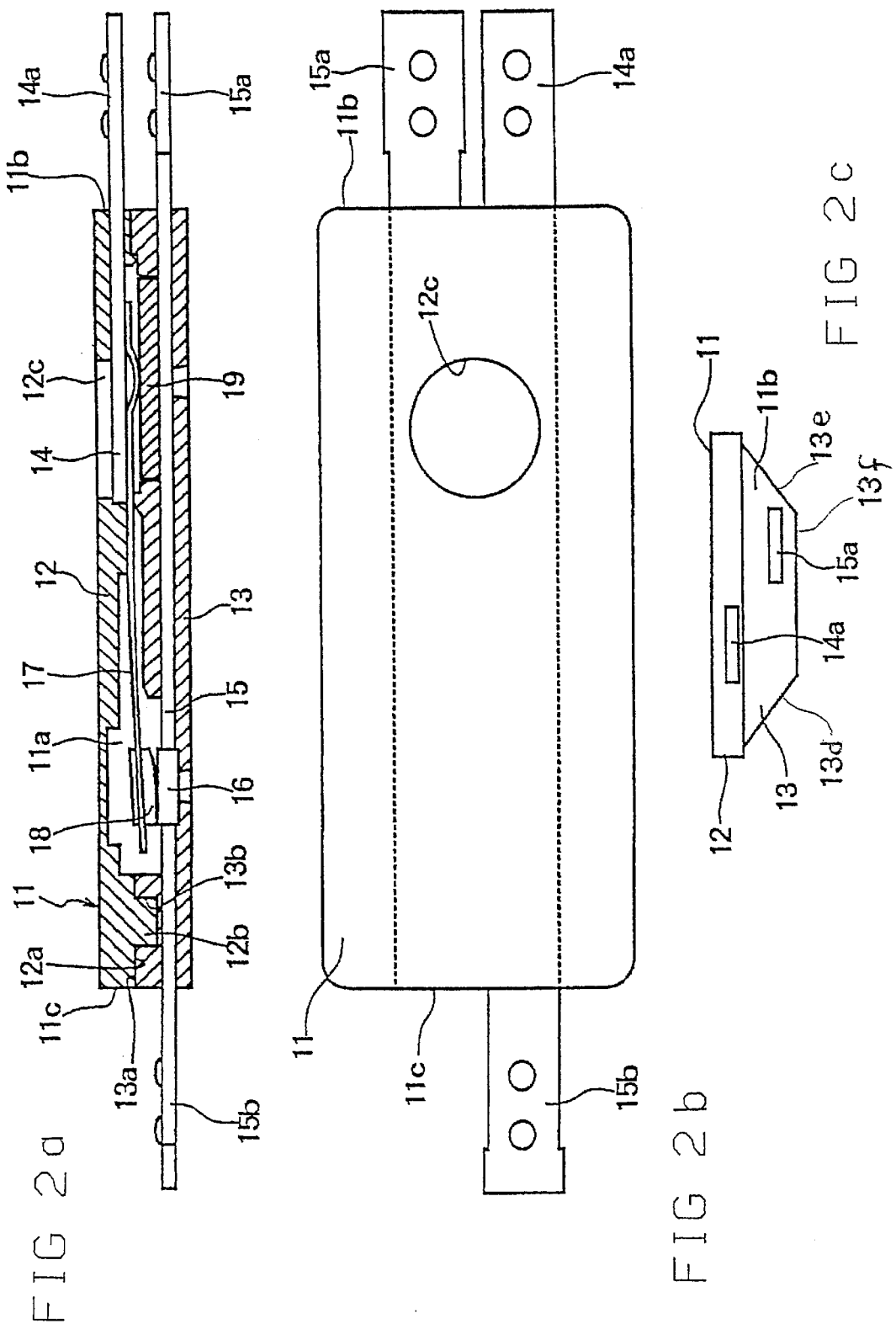
FIGS. 2(a), 2(b) and 2(c) are side cross sectional with the electrical contacts shown in the closed position, top plan and end views respectively of the battery protector shown in FIG. 1.
Figures 4A, 4B:
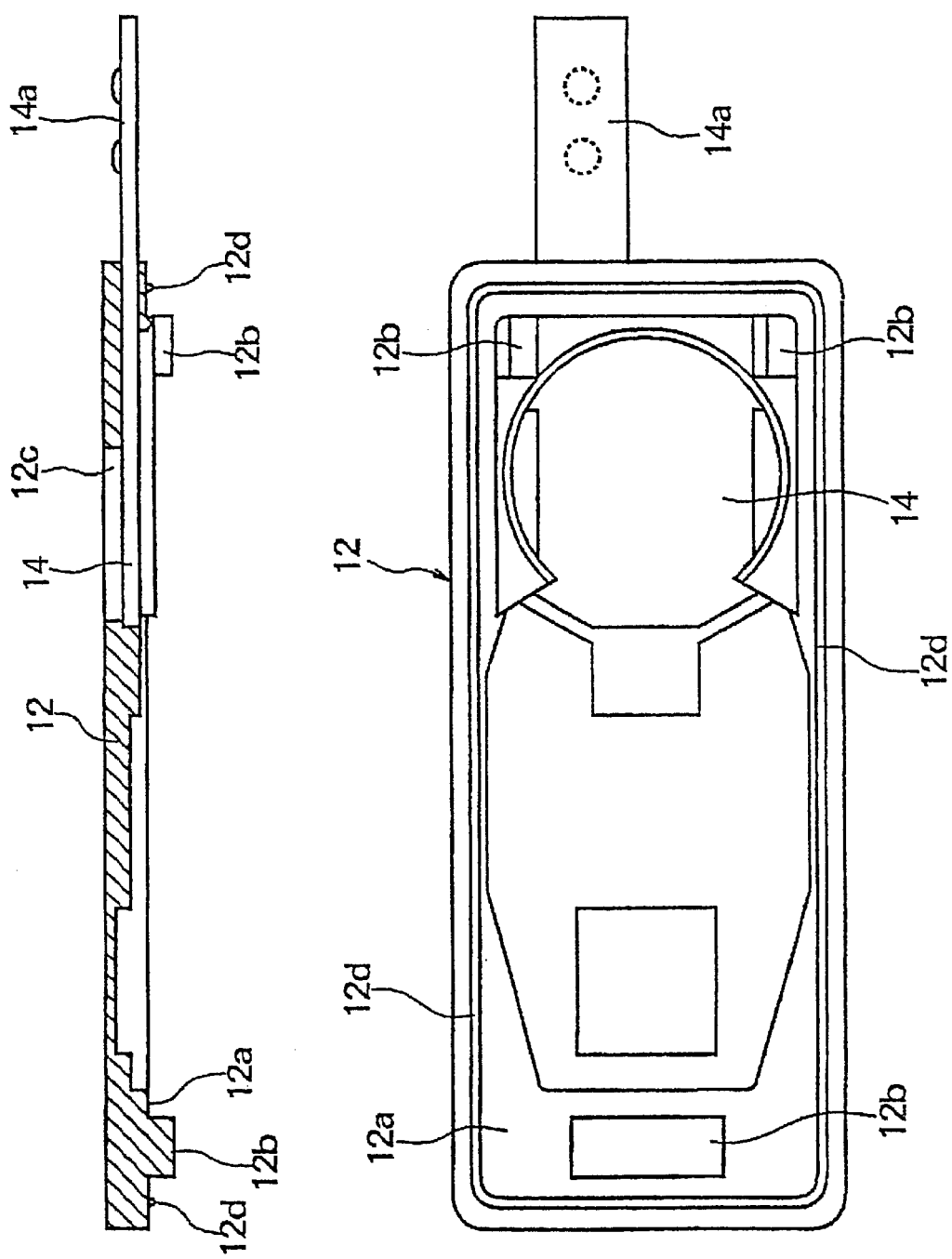
FIGS. 4a and 4b are side cross sectional and bottom plan views respectively of the upper casing member of the FIG. 1 protector prior to assembly.

In connection with the assembly of casing body 11, the mating engagement surfaces 12a and 13a are put together and attached by ultrasonic wave welding. As a result of the ultrasonic wave welding, effective sealing of the casing body is assured, thereby making it possible to avoid interference between internal and external environments, such as the effects of liquid leakage from the battery and the effects of environmental moisture, etc., on the internal functional parts and the effects of the arc discharge at the electrical contacts. With reference to FIGS. 4b and 5b, each casing member 12 and 13 has three interfitting alignment parts 12b and 13b respectively for positioning on the mating engagement surface. One of the interfitting parts 12b is in the form of a protrusion and the other interfitting part 13b is in the form of a complimentary recess shaped for insertion of part 12b. In FIG. 2a, one protrusion part 12b is shown interfitted with one recess part 13b. The interfitting parts 12b and 13b provide desired horizontal alignment of the casing members relative to one another; however, they are provided with a relatively loose fit in order to permit finite movement of upper casing member 12 relative to lower casing member 13 in the horizontal direction incident to the ultrasonic wave welding procedure.

Battery protector 10 has a pair of external terminals which extend from upper lead 14 and lower lead 15 mounted within casing body 11. Upper lead 14 is connected to a snap-acting thermostatic member 17 inside casing body 11 and, at the same time, terminal part 14a extends outside casing body 11 from one end thereof. As will be described later, upper lead 14 is preferably made integral with upper casing member 12 by being insert molded therein. Stationary contact 16 is supported on lower lead 15 inside casing body 11 with terminals 15a and 15b extending outside from opposite end surfaces 11b and 11c respectively of casing body 11. In use, either terminal 15a or terminal 15b is selectively used and the terminal part that is not in use typically is cut off. As will be described later, lower lead 15 is preferably made integral with lower casing 13 by being insert molded therein. Stationary contact 16, received in an opening formed in lower lead 15 is electrically connected to the lead and a hole formed in lower casing 13 in alignment with stationary contact 16 is suitably sealed.

One end of snap-acting thermostatic member 17 is welded to upper lead 14 inside casing body 11. Prior to assembling the casing body, upper led 14 that has been made integral with upper casing member 12 and snap-acting member 17 are spot-welded by using opening 12c of the upper casing member 12. Snap-acting thermostatic member 17 is formed by bonding two or more metals having different thermal coefficients of expansion, conventionally called a bimetal. This bimetal is formed with a dished configuration in order to effect a snap action from one dished configuration to an oppositely dished configuration when self-induced heat due to electric current that flows through member 17 and/or the ambient temperature causes the member to exceed a preselected temperature.

As shown in FIG. 2a, movable contact 18 is mounted adjacent to the free distal end of member 17. Member 17 is slightly bent downwardly in the normal, non-actuated position, with movable contact 18 in electrical engagement with stationary contact 16. Because of this, upper led 14 and lower lead 15 form a closed circuit path. When terminals 14a and 15a (or 15b) of each of the leads are connected between the electrodes of the battery and the electric product to be protected, contacts 16 and 18 are normally in engagement with one another as seen in FIG. 2a, forming a closed circuit.

Figure 3:
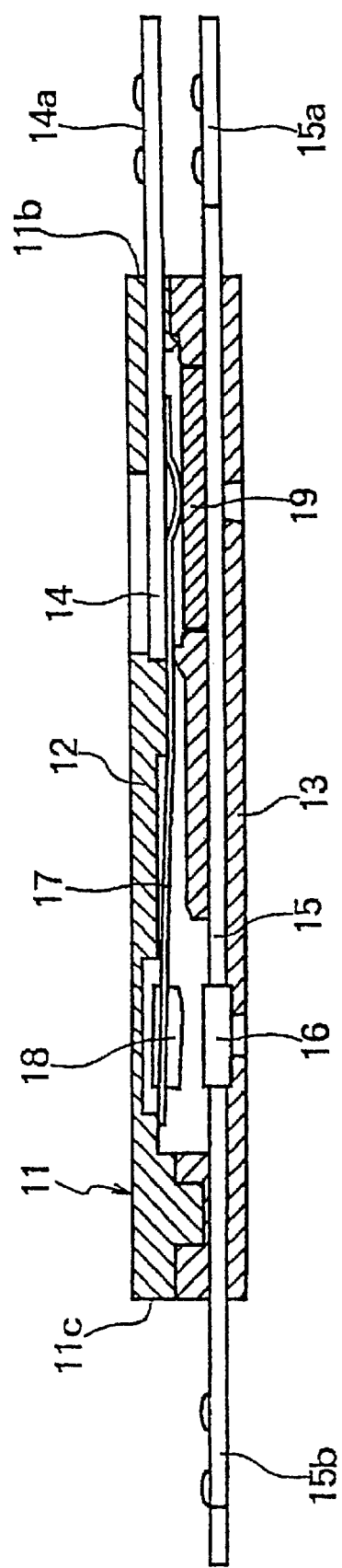
FIG. 3 is similar to FIG. 2(a) but shown with the electrical contacts in the open position.

In the event that the temperature of snap-acting member 17 rises above the preselected temperature due to an increase in the ambient temperature and/or excess current through member 17, the member snaps with the distal end portion moving away from the stationary contact due to the difference in the rates of elongation of the two or more metals of the bimetal member. Because of this snap action, movable contact 18 moves out of electrical engagement with stationary contact 16 as shown in FIG. 3. The rise in temperature of member 17 reflects the elevation of the ambient temperature of the battery protector 10 and/or the self-induced heat of snap-acting member 17. Accordingly, snap-acting member 17 acts in response to the generation of heat in the battery that is connected thereto or by the excess current through the protector, with a result that the power supply circuit is opened.

As the supply of the electric current is terminated and the temperature of the member 17 falls, member 17 assumes the original state with movable contact 18 engaging stationary contact 16 and upper lead 14 and lower lead 15 again forming a circuit path.

Battery protector 10 made according to this embodiment can accommodate a positive temperature coefficient of resistivity (PTC) thermistor 19 in its interior. The PTC thermistor functions to maintain the contacts in the disengaged position once bimetal member 17 actuates due to current and/or excess ambient temperature. PTC thermistor 19 is a disc-shaped member that has opposing electrode surfaces in electrical engagement with fixed portions of lead 15 and bimetal member 17. As best seen in FIGS. 2a and 3, a portion 17a of bimetal member 17 which is attached to upper lead 14 is spaced from the lead to form a spring portion which is biased against the upper electrode surface of thermistor 19. The lower electrode surface is suitably attached to lower lead 15 as by soldering thereto. Accordingly, the PTC thermistor 19 received in an opening 13c of lower casing member 13 best seen in FIGS. 5a, 5b, is connected between upper lead 14 and lower lead 15 in parallel with snap-acting member 17. PTC thermistor 19 has an extremely high resistance (such as 1000 times) compared with the resistance of the electric current path that is formed by snap-acting member 17 and a positive temperature coefficient, with the resistance value increasing along with an elevation of its temperature.

Accordingly, in the normal state, that is, the state where both contacts 16 and 18 are in engagement, the electric current flowing through the positive property thermistor is minimal. On the other hand, when both contacts 16 and 18 are separated as snap-acting member 17 snaps from the closed configuration to the open configuration due to excess current and/or excess heat, electric current flows between the terminals through PTC thermistor 19. Because of this electric current, PTC thermistor 19 itself generates heat and continues heating the snap-acting member 17 maintaining its temperature above the reset or return temperature. An advantage accompanying the use of PTC thermistor 19 for maintaining the open contact state lies in the fact that its resistance value changes with changes in temperature, thereby making it possible for the thermistor to effect self control. In other words, the resistance increases as the temperature rises, with a result that there takes place a decrease in electric current. On the other hand, a reduction in electric current lowers the temperature of the PTC thermistor, with a resultant drop in the resistance and an increase in electric current and concomitant elevation in temperature. Through repetition of this cycle, the electric current and the temperature are self-controlled and are stabilized at a fixed level.

With reference to FIGS. 4a, 4b, the mating engagement surface 12a of a prescribed width is formed along the periphery on the bottom side of upper casing member 12 and, as seen in FIGS. 5a, 5b, mating engagement surface 13a is similarly formed along the periphery on the opposing surface on lower casing member 13. A peak-shaped stripe or ridge 12d is formed along the periphery of surface 12a at a location spaced slightly inboard of the outer periphery. The mating engagement surface 13a of lower casing member 13 that opposes stripe 12d is a smooth surface and stripe 12d is set against mating engagement surface 13a. Upper casing member 12 is subjected to ultrasonic wave vibrations and the ambient temperature is elevated relative to lower casing member 13 that has been fixed, causing stripe 12d to melt with a result that the mutual engagement surfaces 12a and 13a are united. FIG. 4a, 4b also show three protruding alignment parts 12b on the bottom of the upper casing member 12 while FIGS. 5a, 5b show three cooperating recessed alignment parts 13b which respectively receive protruding alignment parts 12b.

Figure 6:
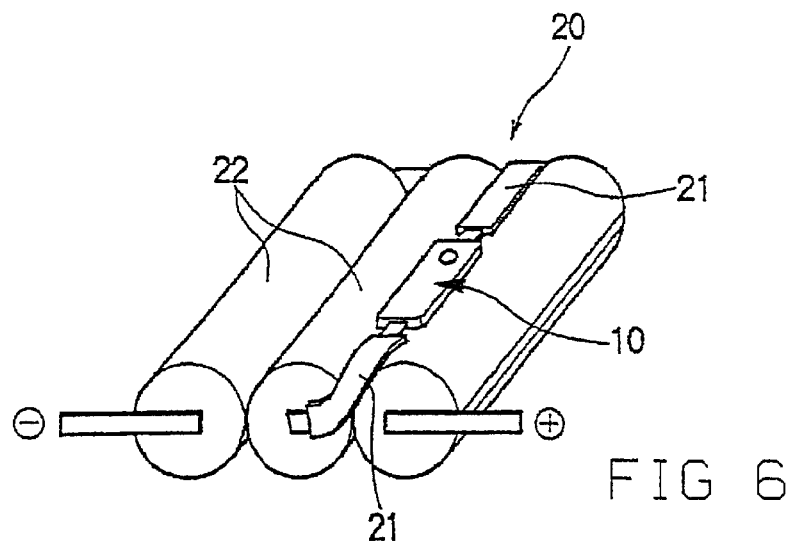
FIG. 6 is a perspective view showing the battery protector made according to the first embodiment installed in a battery pack.

FIG. 6 shows battery protector 10 placed inside a battery pack 20. In the figure, three secondary batteries 22 are parallelly disposed and connected in series, with the battery protector 10 also serially connected. In FIG. 6, the outer casing of the battery pack is omitted for purposes of illustration. Lead members 21 provided with an electrically insulative coating, are connected to the terminals that extend from opposite ends of battery protector 10. Battery protector 10 is arranged along the generally triangular valley or recess 22a formed between contiguous secondary batteries 22 with the obliquely slanted surfaces of lower casing member 13 facing downwardly as shown in the drawing. In this example, battery protector 10 is constructed so that the terminals extend from both ends in opposite directions as compared with conventional protectors in which both terminals extend from one end. Thus, as shown in FIG. 6, lead members 21 that are connected to terminals 15b, 14a, extend approximately in a straight line to the positive pole of one cell and the negative pole of another secondary cell and, accordingly, wiring becomes extremely efficient with effective utilization of available space. Since the lower lead 15a extends from the same end as terminal part 14a of the upper lead and is not used in the described wiring arrangement, terminal part 15a can be cut off.

Figure 7:
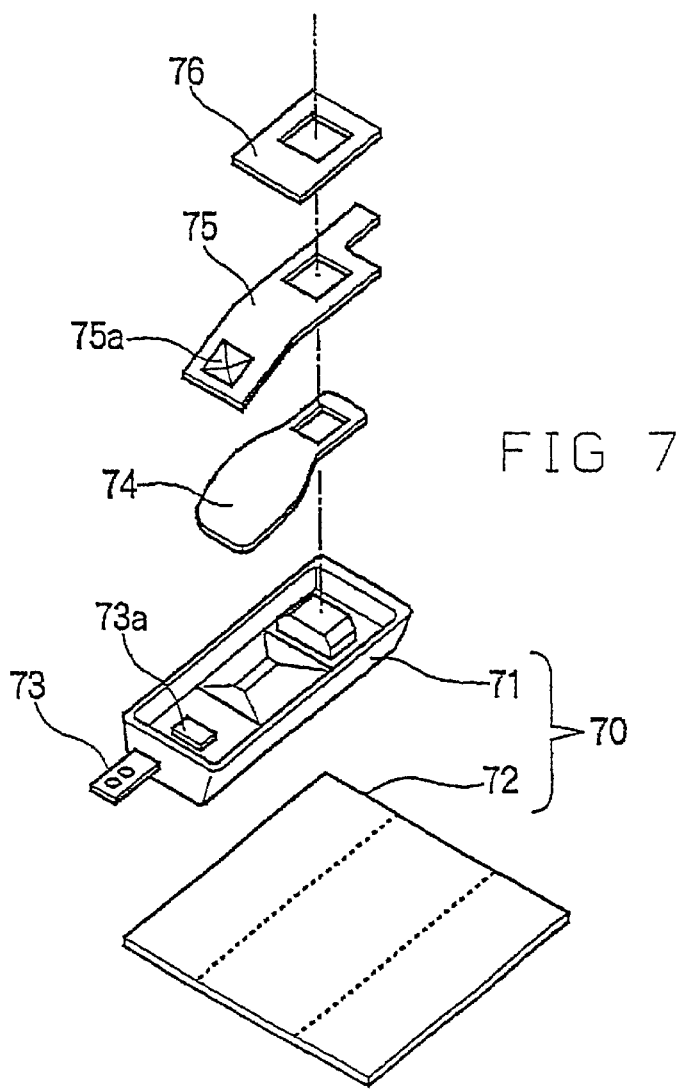
FIG. 7 is an exploded perspective view of a battery protector made according to another embodiment of the invention.

FIG. 7 shows a perspective view of a battery protector made according to another embodiment of the invention. In this embodiment, one of the casing members comprising the casing body is formed of an insulating film. In other words, casing body 70 comprises lower casing member 71 that has been formed integrally with the lower lead 73 by insert molding and the other casing member comprises insulating film 72 that has a suitable size to enclose the cavity formed in lower casing member 71 as by enveloping the lower casing member. Polyimide resin can be used for the material of insulating film 72, by way of example. Snap-acting member 74, upper lead 75 and fixed locking member 76 are installed in that order from the opening at the top of lower casing member 71. When these components have been installed, movable contact 75a of upper lead 75 (the contact surface being disposed on the bottom side of member 74 and hidden from the view shown) and stationary contact 73a of lower lead 73 face each other for engagement. When snap-acting member 74, arranged between the leads 73 and 75, is thermally affected by excess current through the leads, the member snaps to its opposite actuated dished configuration with the distal free end moving upwardly thereby pushing up the distal free end of upper lead 75 and thus separating contacts 73a and 75a.

Following assembly of these parts into the cavity in lower casing member 71, the opening at the top of lower casing member 71 is covered by rolling insulating film 72 over lower casing member 71. The upper periphery of the lower casing member and the surface of the insulating film 72 that is in contact with it adhere to each other by means of a heat treatment. In this connection, the two opposed end portions of insulating film 72 may overlap one another, the insulating film 72 being wound over the lower casing member 71 and this joined part welded by means of ultrasonic waves. However, the insulating film 72 does not have to be so large as to wrap around the lower casing member 71 but only of such a size as to at least cover the opening at the top.

The invention has been explained by referring to the attached drawings. It is clear that the scope of the invention should not be limited to the items shown in the described embodiments. For example, in the described embodiments, one of the leads (lower lead 15) has two terminal parts 15a and 15b that extend from opposite ends of casing body 11. However, it will be realized that lead 15 may have only terminal part 15b on the end which is opposite to the end where the terminal part extends from the other lead (upper lead 14). It is also within the purview of the invention to form the lower casing member that has formed the space for the accommodation of the functional parts of the protector, integrally with both leads by insert molded, with the upper casing member being formed in the shape of a flat cover. The casing body may be formed by placing the upper casing member in the shape of a cover in such a way as to close the opening at the top of the lower casing member that accommodates the functional parts, with the joined surfaces being welded by ultrasonic waves.

According to the invention described above, the accommodation into the battery pack can be carried out efficiently as the external terminals extend from the surfaces at the opposing ends. Since the battery protection device made in accordance with the invention does not require an adhesive agent in its assembling, it can be placed in the battery pack immediately after assembling. By forming the casing member integrally with the external terminal by insert molding, moreover, errors among the various parts can be minimized. As a result of this, the reliability of its operation can be improved.

It is, therefore, the intention that the appended claims be interpreted as broadly as possible in view of the prior art to include all such variations and modifications.

What is claimed:

1. A battery protection device comprising a generally oblong casing formed of electrically insulative material having first and second opposed side end surfaces, the casing having an upper and lower casing member, the upper casing member having a top surface of a selected area and a lower casing member which together define a cavity therebetween, the lower casing member having front and back surfaces with a central portion therebetween, the front and back surfaces being obliquely slanted inwardly toward the central portion, a current responsive thermostatic switch disposed within the cavity, the switch connected to first and second terminals, the first terminal extending outwardly through the first side end surface and the second terminal extending outwardly through the second side end surface, said first terminal being insert molded in the upper casing member and said second terminal member being insert molded in the lower casing member.

2. A battery protection device according to claim 1 in which the upper and lower casing member have facing surfaces which engage each other and one of the upper and lower casing members has a plurality of alignment protrusions formed in a facing surface and the other of the upper and lower casing members has a matching plurality of alignment recesses which receive respective protrusions, the protrusions fitting in the recesses with sufficient clearance to permit ultrasonic welding of the casing members together.

3. A battery protection device according to claim 1 in which the current responsive thermostatic switch comprises a snap-acting thermostatic member having two opposite end portions, one end portion fixedly connected to the first terminal member and the other end portion having a free distal end, a stationary electrical contact fixedly connected to the second terminal member, and a movable electrical contact mounted on the thermostatic member adjacent to the free distal end thereof movable into and out of engagement with the stationary electrical contact.

4. A battery protection device according to claim 3 in which the one end portion of the snap-acting thermostatic member connected to the first terminal member includes a portion separated and spaced from the first terminal member forming a spring contact and further comprising a PTC thermistor having opposed contact surfaces received in the cavity, the spring contact biased against one opposed contact surface and the other contact surface electrically connected to the second terminal member.

5. A battery protection device according to claim 1 in which the upper casing member comprises a sheet of insulating material.

6. A battery protection device according to claim 1 further comprising a plurality of batteries having generally cylindrically shaped housings disposed side by side forming a recessed portion between contiguous batteries, the casing disposed in a recessed portion with the obliquely slanted front and back surfaces each disposed on a different cylindrical shaped housing.

7. A battery protection device according to claim 1 in which the current responsive thermostatic switch comprises a snap-acting thermostatic member movable between oppositely dished configurations having two opposite end portions, one end portion fixedly mounted in the casing, the first terminal member having a movable free distal end extending into the cavity, a stationary electrical contact mounted on the second terminal member and a movable electrical contact mounted on the free distal end of the first terminal member normally biased into engagement with the stationary electrical contact, the thermostatic member having a free distal end portion which engages the free distal end of the first terminal member and moves the free distal end of the first terminal member away from the stationary electrical contact when moving from one of the oppositely dished configuration to the other of the oppositely dished configuration.

8. A method for making a battery protection device comprising the steps of
taking a first terminal member and insert molding the terminal member into a first casing member with a mating surface extending around the periphery of the casing member and with the terminal member extending out of the casing member through an end surface thereof,
taking a second terminal member and insert molding the second terminal member into a second casing member with a mating surface extending around the periphery of the second casing member and with the second terminal member extending out of the second casing member through an end surface thereof, during the insert molding process, forming a cavity in at least one of the first and second casing members and forming a ridge projecting from one of the mating surfaces and extending around the periphery of the respective casing member, incorporating a thermostatic switch in the cavity electrically connected between the first and second terminal members, placing the mating surfaces together with the first and second terminals extending in opposite directions and ultrasonically welding the casing members together.

9. A battery protection device comprising a generally oblong casing formed of electrically insulative material having first and second opposed side end surfaces, the casing having an upper and lower casing member, the upper casing member having a top surface of a selected area and a lower casing member which together define a cavity therebetween, the lower casing member having front and back surfaces with a central portion therebetween, the front and back surfaces being obliquely slanted inwardly toward the central portion, a current responsive thermostatic switch disposed within the cavity, the switch connected to first and second terminals, the first terminal extending outwardly through the first side end surface and the second terminal extending outwardly through the second side end surface, and a PTC thermistor disposed in the casing and electrically connected in parallel with the current responsive thermostatic switch.

10. A battery protection device according to claim 9 in which at least one of the terminal members is insert molded in one of the casing members.

* * * * *